US012779783B2

(12) United States Patent

Yamazaki

(10) Patent No.: US 12,779,783 B2

(45) Date of Patent: Nov. 3, 2026

(54) CONTROL DEVICE

(71) Applicant: SEIKO EPSON CORPORATION, Tokyo (JP)

(72) Inventor: Shigeru Yamazaki, Shiojiri (JP)

(73) Assignee: SEIKO EPSON CORPORATION (JP)

(*) Notice: Subject to any disclaimer, the term of this patent is extended or adjusted under 35 U.S.C. 154(b) by 569 days.

(21) Appl. No.: 18/364,751

(22) Filed: Aug. 3, 2023

(65) Prior Publication Data

US 2024/0042695 A1 Feb. 8, 2024

(30) Foreign Application Priority Data

Aug. 4, 2022 (JP) ................................ 2022-124844

(51) Int. Cl.

*B29C 64/386* (2017.01)
*B33Y 50/00* (2015.01)
*G05B 19/418* (2006.01)

(52) U.S. Cl.

CPC ............ *B29C 64/386* (2017.08); *B33Y 50/00* (2014.12); *G05B 19/4187* (2013.01); *G05B 2219/23135* (2013.01)

(58) Field of Classification Search

CPC ..... B29C 64/386; B29C 64/393; B33Y 50/00; B33Y 10/00; B33Y 50/02; G05B 19/4187; G05B 2219/23135; G05B 2219/49023; G05B 19/4099; B22F 10/18; B22F 10/85

See application file for complete search history.

(56) References Cited

U.S. PATENT DOCUMENTS

| | | | | |
|---|---|---|---|---|
| 2016/0200084 | A1* | 7/2016 | Hays | B33Y 10/00 156/62.2 |
| 2017/0153858 | A1 | 6/2017 | Sato | |
| 2017/0210116 | A1 | 7/2017 | Shirakawa | |
| 2018/0150263 | A1 | 5/2018 | Harayama | |
| 2018/0364680 | A1* | 12/2018 | Tanaka | B33Y 50/02 |
| 2022/0203617 | A1* | 6/2022 | Pekic | B29C 64/30 |

FOREIGN PATENT DOCUMENTS

| | | | | |
|---|---|---|---|---|
| JP | 2012-101443 | A | | 5/2012 |
| JP | 2013067018 | A | * | 4/2013 |
| JP | 2016027468 | A | * | 2/2016 |
| JP | 2017-094692 | A | | 6/2017 |

(Continued)

*Primary Examiner* — Kamini S Shah
*Assistant Examiner* — Michael Tang
(74) *Attorney, Agent, or Firm* — Harness, Dickey & Pierce, P.L.C.

(57) ABSTRACT

A control device communicating with a plurality of three-dimensional shaping devices is provided. The control device includes a display control unit configured to display, on a display unit, time information indicating a time, operation information including information indicating a shaping time of a model in each of the three-dimensional shaping devices, and remaining amount information indicating a remaining amount of a material used in the three-dimensional shaping device selected from the plurality of three-dimensional shaping devices. The display control unit displays the operation information corresponding to the time information, and the display control unit displays the time information in a specified scale or a specified time zone.

8 Claims, 16 Drawing Sheets

(56) References Cited

FOREIGN PATENT DOCUMENTS

| | | | | | |
|---|---|---|---|---|---|
| JP | 2017-134547 | A | | 8/2017 | |
| JP | 2019111779 | A | * | 7/2019 | |
| JP | 6732497 | B2 | * | 7/2020 | |
| JP | 2021-146633 | A | | 9/2021 | |
| KR | 20190070244 | A | * | 6/2019 | ........... B29C 64/171 |

* cited by examiner

CONTROL DEVICE

The present application is based on, and claims priority from JP Application Serial Number 2022-124844, filed Aug. 4, 2022, the disclosure of which is hereby incorporated by reference herein in its entirety.

BACKGROUND

1. Technical Field

The present disclosure relates to a control device.

2. Related Art

JP-A-2012-101443 discloses a data conversion device that converts three-dimensional model data into slice data. The data conversion device acquires characteristic information capable of identifying a shaping method adopted by a shaping device, and converts the three-dimensional model data into the slice data by a conversion process selected from a plurality of different conversion processes according to the acquired characteristic information.

In the related art, in the technical field related to such three-dimensional shaping, a technique capable of efficiently managing a plurality of three-dimensional shaping devices is required.

SUMMARY

According to a first aspect of the present disclosure, a control device communicating with a plurality of three-dimensional shaping devices is provided. The control device includes a display control unit configured to display, on a display unit, time information indicating a time, operation information including information indicating a shaping time of a model in each of the three-dimensional shaping devices, and remaining amount information indicating a remaining amount of a material used in the three-dimensional shaping device selected from the plurality of three-dimensional shaping devices. The display control unit displays the operation information corresponding to the time information, and the display control unit displays the time information in a specified scale or a specified time zone.

DESCRIPTION OF EMBODIMENTS

A. First Embodiment

Figure 1:
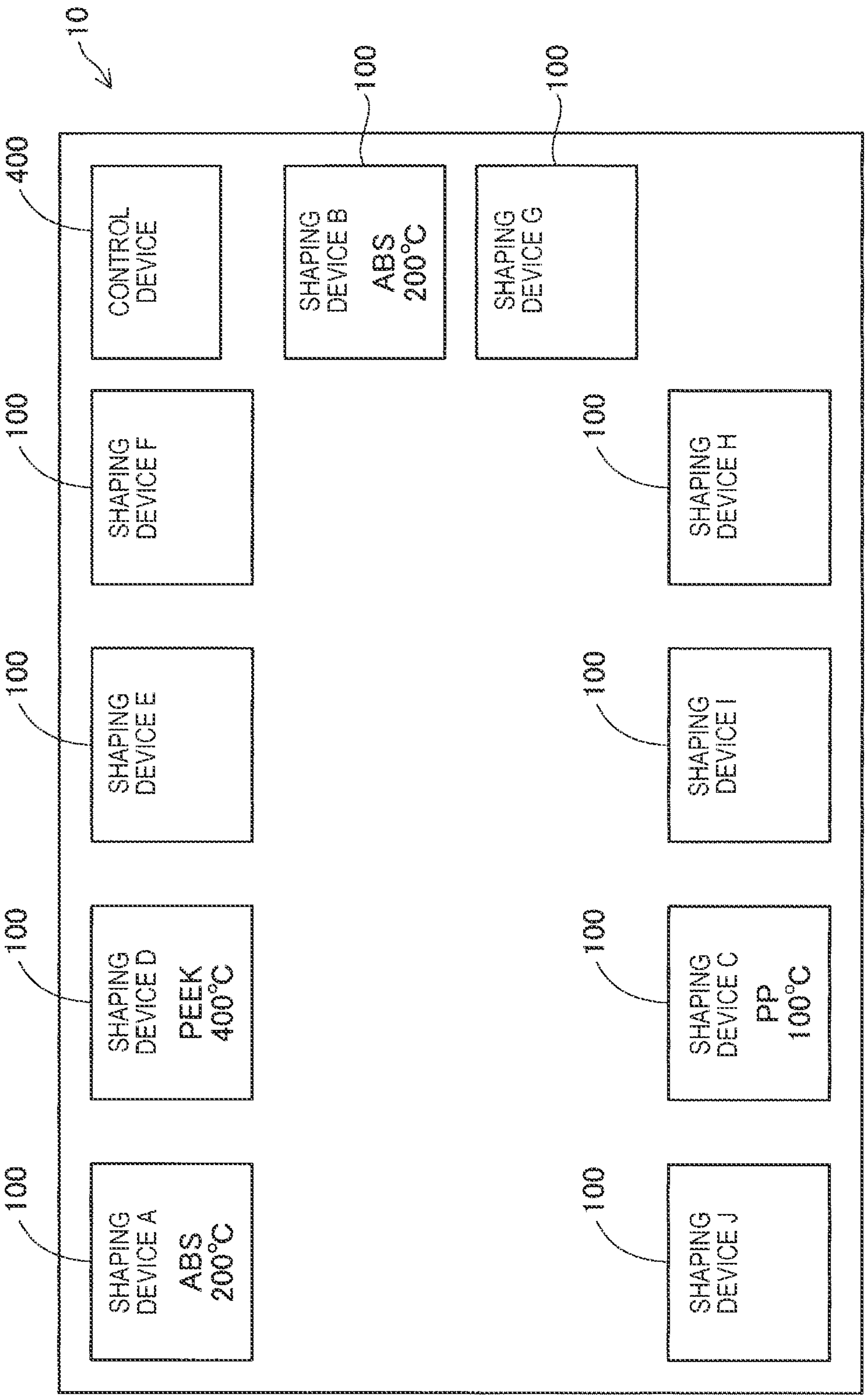
FIG. 1 shows a schematic configuration of a three-dimensional shaping system according to a first embodiment.

FIG. 1 is a diagram showing a schematic configuration of a three-dimensional shaping system 10 according to a first embodiment. The three-dimensional shaping system 10 includes a plurality of three-dimensional shaping devices 100 and a control device 400 that communicates with these three-dimensional shaping devices 100. The control device 400 and the plurality of three-dimensional shaping devices 100 can communicate with each other via a predetermined communication line such as the Internet or a LAN. The three-dimensional shaping system 10 is provided in a place such as a factory, a research establishment, or a commercial facility. In the embodiment, the plurality of three-dimensional shaping devices 100 and the control device 400 are provided in a same place. The three-dimensional shaping devices 100 and the control device 400 may be provided not in the same place but in separate places.

Figure 2:
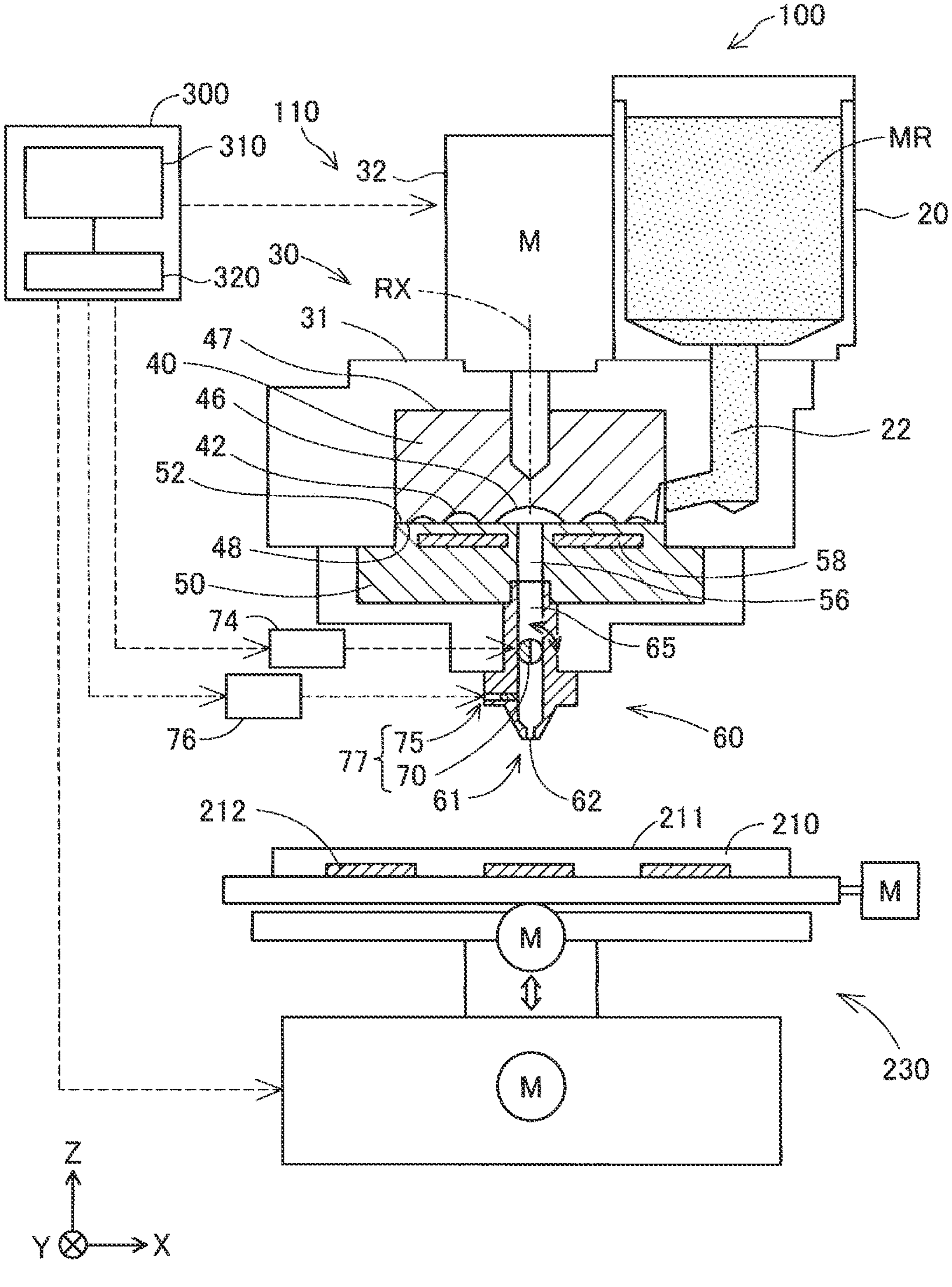
FIG. 2 shows a schematic configuration of a three-dimensional shaping device.

FIG. 2 shows a schematic configuration of the three-dimensional shaping device 100. In FIG. 2, arrows indicating X, Y, and Z directions orthogonal to one another are shown. The X direction and the Y direction are directions parallel to a horizontal plane, and the Z direction is a direction along a vertically upward direction. The arrows indicating the X, Y, and Z directions are also shown in other drawings as appropriate such that the directions shown in the drawings correspond to those in FIG. 2. In the following description, when an orientation of a direction is identified, a direction indicated by an arrow in each drawing is referred to as "+", a direction opposite therefrom is referred to as "−", and a positive or negative sign is used in combination with a direction notation. Hereinafter, a +Z direction is also referred to as "upper", and a −Z direction is also referred to as "lower".

The three-dimensional shaping device 100 according to the embodiment is a device that forms a shaped object by a material extrusion method. The three-dimensional shaping device 100 includes a control unit 300 that controls units of the three-dimensional shaping device 100. The control unit 300 and the control device 400 are communicably coupled to each other.

The three-dimensional shaping device 100 includes a shaping unit 110 that generates and ejects a shaping material, a shaping stage 210 serving as a base of a shaped object, and a moving mechanism 230 that controls an ejection position of the shaping material.

The shaping unit 110 ejects the shaping material obtained by plasticizing a material in a solid state onto the stage 210 under the control of the control unit 300. The shaping unit 110 includes a material supply unit 20 that is a supply source of a raw material before being converted into the shaping material, a plasticizing unit 30 that converts the raw material into the shaping material, and an ejection unit 60 that ejects the shaping material.

The material supply unit 20 supplies a raw material MR to the plasticizing unit 30. The material supply unit 20 includes, for example, a hopper that accommodates the raw material MR. The material supply unit 20 is coupled to the plasticizing unit 30 via a communication path 22. The raw material MR is fed into the material supply unit 20 in a form of pellets, powder, or the like. As the raw material, a resin material such as acrylonitrile butadiene styrene (ABS), polyether ether ketone (PEEK), or polypropylene (PP) is used.

The plasticizing unit 30 plasticizes the raw material MR supplied from the material supply unit 20 to generate a paste-shaped shaping material exhibiting fluidity, and guides the shaping material to the ejection unit 60. In the embodiment, the term "plasticization" is a concept including melting, and is a change from a solid state to a fluid state. Specifically, in a case of a material in which glass transition occurs, the plasticization refers to setting a temperature of the material to be equal to or higher than a glass transition point. In a case of a material in which the glass transition does not occur, the plasticization refers to setting a temperature of the material to be equal to or higher than a melting point thereof.

The plasticizing unit 30 includes a screw case 31, a drive motor 32, a flat screw 40, and a barrel 50. The flat screw 40 is also referred to as a rotor or a scroll. The barrel 50 is also referred to as a screw facing portion.

Figure 3:
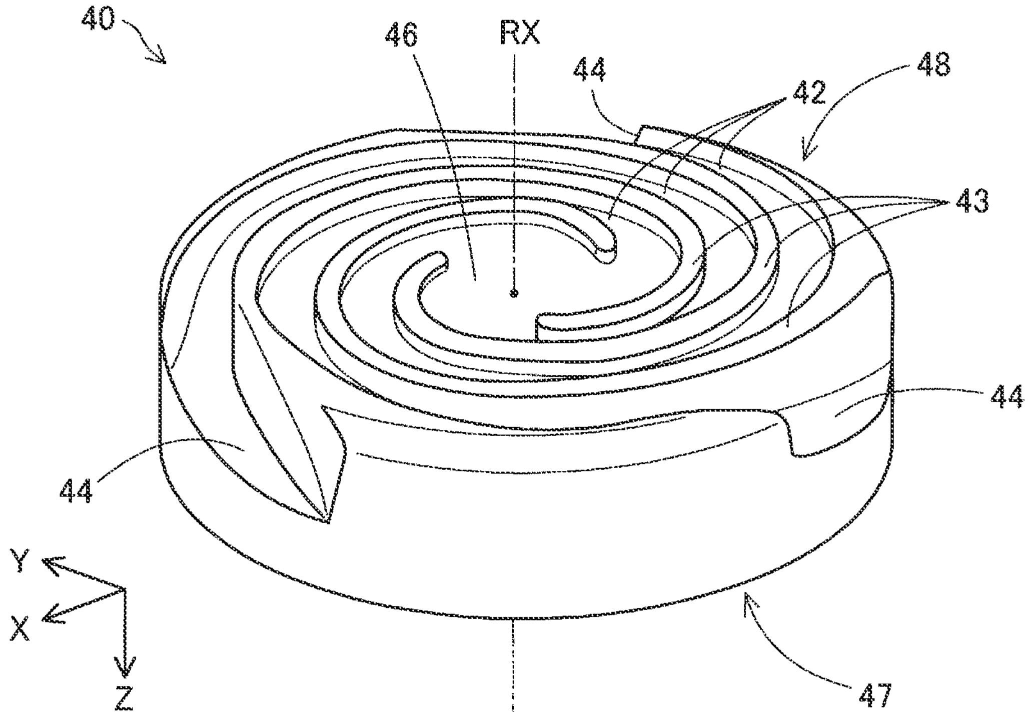
FIG. 3 is a perspective view showing a schematic configuration of a flat screw.
Figure 4:
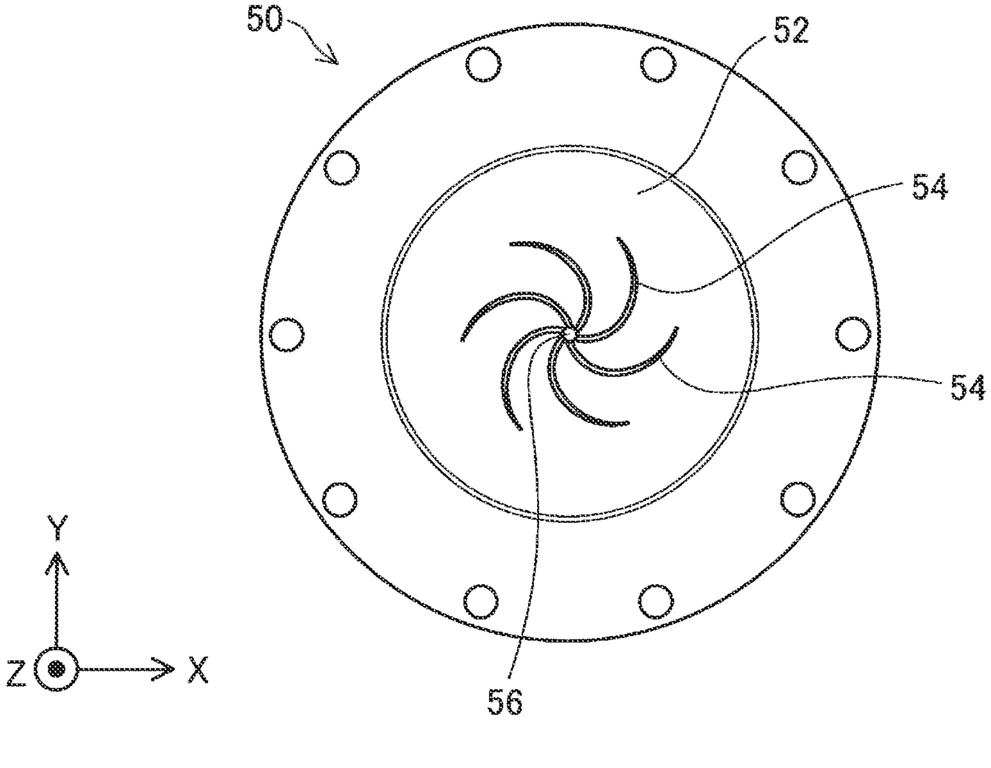
FIG. 4 is a schematic plan view of a barrel.

FIG. 3 is a perspective view showing a schematic configuration of the flat screw 40 on a lower surface 48 side. In order to facilitate understanding of the technique, the flat screw 40 shown in FIG. 3 is shown in a state in which a positional relationship between an upper surface 47 and the lower surface 48 shown in FIG. 2 is reversed in a vertical direction. FIG. 4 is a schematic plan view showing the barrel 50 on an upper surface 52 side. The flat screw 40 has a substantially cylindrical shape in which a length in an axial direction which is a direction along a center axis of the flat screw 40 is smaller than a length in a direction orthogonal to the axial direction. The flat screw 40 is disposed such that a rotation axis RX serving as a rotation center of the flat screw 40 is parallel to the Z direction.

As shown in FIG. 2, the flat screw 40 is accommodated in the screw case 31. The upper surface 47 of the flat screw 40 is coupled to the drive motor 32, and the flat screw 40 is rotated in the screw case 31 by a rotational driving force generated by the drive motor 32. The drive motor 32 is driven under the control of the control unit 300. The flat screw 40 may be driven by the drive motor 32 via a speed reducer.

As shown in FIG. 3, spiral groove portions 42 are formed in the lower surface 48 of the flat screw 40, which is a surface intersecting the rotation axis RX. The communication path 22 of the material supply unit 20 described above communicates with the groove portions 42 from a side surface of the flat screw 40. In the embodiment, three groove portions 42 are formed by being separated by ridge portions 43. The number of groove portions 42 is not limited to three, and may be one or two or more. A shape of the groove portion 42 is not limited to the spiral shape, and may be a helical shape or an involute curve shape, or may be a shape extending in a manner of drawing an arc from a center portion toward an outer periphery.

The lower surface 48 of the flat screw 40 faces the upper surface 52 of the barrel 50, and a space is formed between the groove portions 42 of the lower surface 48 of the flat screw 40 and the upper surface 52 of the barrel 50. The raw material MR is supplied from the material supply unit 20 to the space between the flat screw 40 and the barrel 50 through material inlets 44 shown in FIG. 3.

As shown in FIG. 2, a barrel heater 58 for heating the raw material MR supplied into the groove portions 42 of the rotating flat screw 40 is embedded in the barrel 50. A communication hole 56 is provided at a center of the barrel 50. As shown in FIG. 4, a plurality of guide grooves 54 coupled to the communication hole 56 and extending in a spiral shape from the communication hole 56 toward the outer periphery are formed on the upper surface 52 of the barrel 50. One end of the guide groove 54 may not be coupled to the communication hole 56. The guide grooves 54 may be omitted.

The raw material MR supplied into the groove portions 42 of the flat screw 40 flows along the groove portions 42 by the rotation of the flat screw 40 while being plasticized in the groove portions 42, and is guided to a center portion 46 of the flat screw 40 as the shaping material. The paste-shaped shaping material that flows into the center portion 46 and that exhibits fluidity is supplied to the ejection unit 60 via the communication hole 56 provided at the center of the barrel 50. In the shaping material, not all types of substances constituting the shaping material may be plasticized. The shaping material may be converted into a state having the fluidity as a whole by plasticizing at least some types of substances among the substances constituting the shaping material.

The ejection unit 60 in FIG. 2 includes a nozzle 61 that ejects the shaping material, a shaping material flow path 65 formed between the flat screw 40 and a nozzle opening 62, and an ejection control unit 77 that controls the ejection of the shaping material.

The nozzle 61 is coupled to the communication hole 56 of the barrel 50 through the flow path 65. The nozzle 61 ejects the shaping material generated in the plasticizing unit 30 from the nozzle opening 62 at a tip end toward the stage 210.

The ejection control unit 77 includes an ejection adjustment unit 70 that opens and closes the flow path 65, and an aspiration unit 75 that aspirates and temporarily stores the shaping material.

The ejection adjustment unit 70 is provided in the flow path 65, and changes an opening degree of the flow path 65 by being rotated in the flow path 65. In the embodiment, the ejection adjustment unit 70 is implemented by a butterfly valve. The ejection adjustment unit 70 is driven by a first drive unit 74 under the control of the control unit 300. The first drive unit 74 is implemented by, for example, a stepping motor. The control unit 300 uses the first drive unit 74 to control a rotation angle of the butterfly valve, so that a flow rate of the shaping material flowing from the plasticizing unit 30 to the nozzle 61, that is, an ejection amount of the shaping material ejected from the nozzle 61 can be adjusted. The ejection adjustment unit 70 can adjust the ejection amount of the shaping material and can control ON/OFF of outflow of the shaping material.

The aspiration unit 75 is coupled between the ejection adjustment unit 70 in the flow path 65 and the nozzle opening 62. The aspiration unit 75 temporarily aspirates the shaping material in the flow path 65 when the ejection of the shaping material from the nozzle 61 is stopped, thereby preventing a tailing phenomenon in which the shaping material drips from the nozzle opening 62 in a form of a thread. In the embodiment, the aspiration unit 75 includes a plunger. The aspiration unit 75 is driven by a second drive unit 76 under the control of the control unit 300. The second drive unit 76 is implemented by, for example, the stepping motor, or a rack-and-pinion mechanism that converts a rotational force of the stepping motor into a translational motion of a plunger.

The stage 210 is disposed at a position facing the nozzle opening 62 of the nozzle 61. In the first embodiment, a shaping surface 211 of the stage 210 facing the nozzle opening 62 of the nozzle 61 is parallel to the X and Y directions, that is, a horizontal direction. The stage 210 is provided with a stage heater 212 for preventing rapid cooling of the shaping material ejected onto the stage 210. The stage heater 212 is controlled by the control unit 300.

The moving mechanism 230 changes a relative position between the stage 210 and the nozzle 61 under the control of the control unit 300. In the embodiment, a position of the nozzle 61 is fixed, and the moving mechanism 230 moves the stage 210. The moving mechanism 230 is implemented by a three-axis positioner that moves the stage 210 in three-axial directions of X, Y, and Z directions by driving forces of three motors. In the present specification, unless otherwise specified, a movement of the nozzle 61 means relatively moving the nozzle 61 or the ejection unit 60 with respect to the stage 210.

In another embodiment, instead of the configuration in which the stage 210 is moved by the moving mechanism 230, a configuration may be adopted in which the moving mechanism 230 moves the nozzle 61 with respect to the stage 210 in a state in which a position of the stage 210 is fixed. A configuration in which the moving mechanism 230 moves the stage 210 in the Z direction and moves the nozzle 61 in the X and Y directions, or a configuration in which the moving mechanism 230 moves the stage 210 in the X and Y directions and moves the nozzle 61 in the Z direction may be adopted. With these configurations, a relative positional relationship between the nozzle 61 and the stage 210 can be changed.

The control unit 300 is a device which controls overall operations of the three-dimensional shaping device 100. The control unit 300 is implemented by a computer including one or more processors 310, a storage unit 320 including a main storage device and an auxiliary storage device, and an input and output interface that receives and outputs a signal from and to the outside. By executing a program stored in the storage unit 320, the processor 310 controls the shaping unit 110 and the moving mechanism 230 according to shaping data stored in the storage unit 320, thereby performing shaping of a model on the stage 210. Instead of being implemented by the computer, the control unit 300 may be implemented by a configuration in which circuits are combined.

Figure 5:
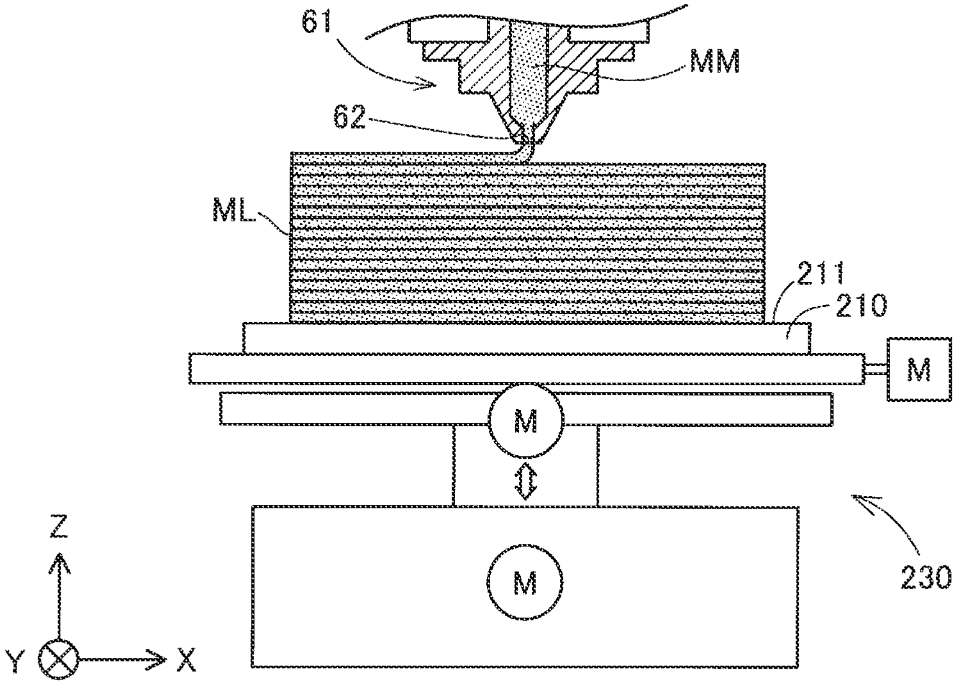
FIG. 5 schematically shows a state in which the three-dimensional shaping device forms a shaped object.

FIG. 5 schematically shows a state in which the three-dimensional shaping device 100 forms a shaped object. In the three-dimensional shaping device 100, as described above, the solid raw material MR is plasticized to generate a shaping material MM. The control unit 300 keeps a distance between the shaping surface 211 of the stage 210 and the nozzle 61 and ejects the shaping material MM from the nozzle 61 while changing the position of the nozzle 61 with respect to the stage 210 in a direction along the shaping surface 211 of the stage 210. The shaping material MM ejected from the nozzle 61 is continuously deposited in a moving direction of the nozzle 61.

The control unit 300 forms a layer ML by repeating the movement of the nozzle 61. After one layer ML is formed, the control unit 300 relatively moves the position of the nozzle 61 with respect to the stage 210 in the Z direction. Then, the shaped object is formed by further stacking the layer ML on the layers ML formed so far.

For example, the control unit 300 may temporarily interrupt the ejection of the shaping material from the nozzle 61 when the nozzle 61 is moved in the Z direction after one layer ML is completely formed or when there are a plurality of independent shaping regions in each layer. In this case, the flow path 65 is closed by the ejection adjustment unit 70, the ejection of the shaping material MM from the nozzle opening 62 is stopped, and the shaping material in the nozzle 61 is temporarily aspirated by the aspiration unit 75. After changing the position of the nozzle 61, the control unit 300 causes the ejection adjustment unit 70 to open the flow path 65 while discharging the shaping material in the aspiration unit 75, thereby resuming the deposition of the shaping material MM from the changed position of the nozzle 61.

Figure 6:
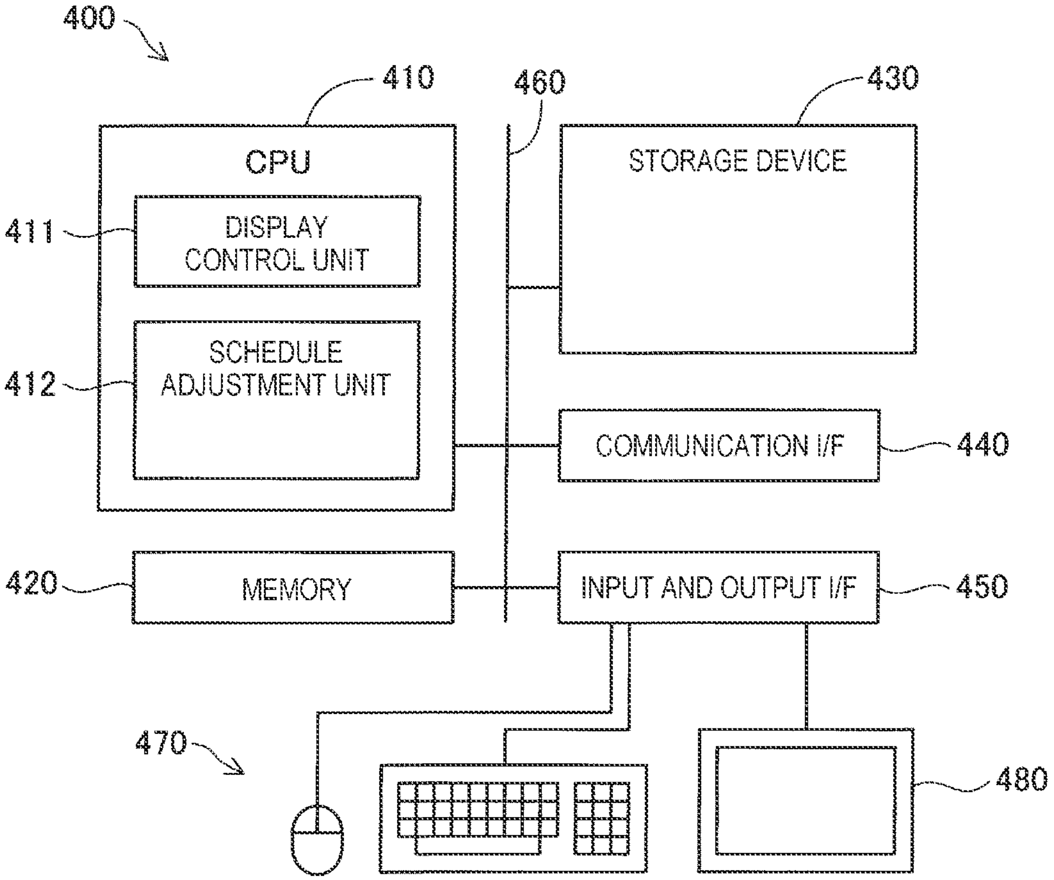
FIG. 6 shows a schematic configuration of a control device.

FIG. 6 shows a schematic configuration of the control device 400. The control device 400 is implemented as a computer in which a CPU 410, a memory 420, a storage device 430, a communication interface 440, and an input and output interface 450 are coupled to one another by a bus 460. An input device 470 such as a keyboard and a mouse and a display unit 480 such as a liquid crystal display are coupled to the input and output interface 450. The control device 400 is coupled to the control unit 300 of the three-dimensional shaping device 100 via the communication interface 440. For example, information indicating a remaining amount of the material fed into the material supply unit 20 of the three-dimensional shaping device 100 and information indicating progress of the model being shaped are transmitted from the control unit 300 to the control device 400. For example, shaping data in which a shaping time is adjusted in the control device 400 is transmitted from the control device 400 to the control unit 300.

The CPU 410 functions as a display control unit 411 and a schedule adjustment unit 412 by executing a program stored in the storage device 430. The display control unit 411 displays a list of shaping schedules in each three-dimensional shaping device 100 on the display unit 480. The schedule adjustment unit 412 adjusts operation information to be described later and adjusts a shaping end time of each three-dimensional shaping device 100.

Figure 7:
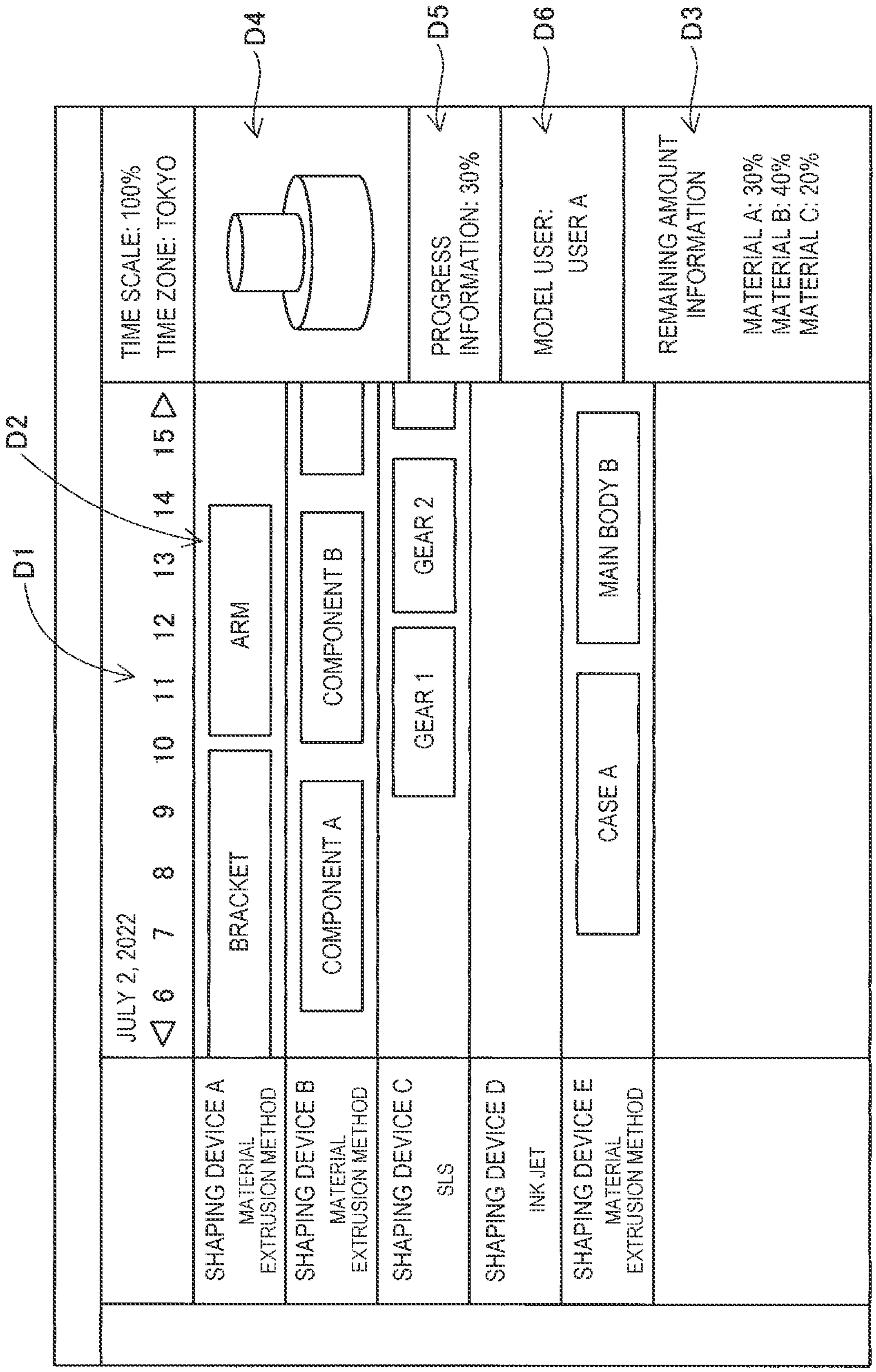
FIG. 7 is a diagram showing an example of a display screen displayed on a display unit by a display control unit.

FIG. 7 is a diagram showing an example of a display screen displayed on the display unit 480 by the display control unit 411. The display control unit 411 displays time information D1, operation information D2, and remaining amount information D3 on the display unit 480. The time information D1 is information indicating a time. The operation information D2 includes information indicating the shaping time of the model in each three-dimensional shaping device 100. The shaping time of the model includes a shaping start time and the shaping end time. In the embodiment, the shaping end time is a time at which cooling of the model after shaping is completed. FIG. 7 shows an example in which a time required for shaping a model for each three-dimensional shaping device 100 is displayed in a strip shape as the operation information D2, and a name of the model is displayed in the strip. One piece of the operation information D2 corresponds to one print job in the three-dimensional shaping device 100. The remaining amount information D3 is information indicating the remaining amount of the material used in the three-dimensional shaping device 100 selected from the plurality of three-dimensional shaping devices 100. A user can select any three-dimensional shaping device 100 from a list of the three-dimensional shaping devices 100 displayed on a left side of the display screen using the input device 470. In the embodiment, as described above, the shaping end time is a time at which the cooling of the model is completed, and the shaping end time may be a time at which the shaping of the model is completed.

The display control unit 411 displays the operation information D2 corresponding to the time information D1. That is, the display control unit 411 displays the time information D1 and the operation information D2 side by side along a common time axis. The user uses the input device 470 to scroll the time information D1 and the operation information D2 along a left-right direction of the display screen, so that the time information D1 and the operation information D2 can be displayed. In the display screen shown in FIG. 7, a time zone of the times indicated by the time information and a time scale can be specified. The user can specify the time zone and the time scale using the input device. The time zone is an entire region that employs a common standard time. The time scale refers to a reduced scale of the time axis on the screen. When the time zone is specified, the display control unit 411 displays the time information D1 according to the specified time zone. When the time scale is changed, the display control unit 411 enlarges or reduces lengths of the time information D1 and the operation information D2 along the time axis. Only one of the time zone and the scale may be specified. The time zone and scale may be set on a screen different from the display screen shown in FIG. 7.

The display control unit 411 according to the embodiment further displays model information D4, progress information D5, and user information D6 on the display unit 480. The model information D4 is information indicating a shape of the model corresponding to the operation information D2. The progress information D5 is information indicating a progress degree of the model being shaped by the selected three-dimensional shaping device 100. The user information D6 is information indicating the user of the model corresponding to the operation information D2, and is, for example, an ID number determined for each user. In the embodiment, the model information D4 and the user information D6 are included in the operation information D2. That is, in the embodiment, the operation information D2 includes the information indicating the shaping time of the model, the user information D6 indicating the user of the model, and the model information D4 indicating the shape of the model.

When any of the plurality of pieces of operation information D2 displayed on the display screen is selected by the input device 470, the display control unit 411 displays the shape of the model corresponding to the operation information D2 as the model information D4 and displays the user of the model corresponding to the operation information D2 as the user information D6. When any three-dimensional shaping device 100 is selected from the plurality of three-dimensional shaping devices 100 displayed in the list on the left side of the display screen, the display control unit 411 displays the information indicating the progress of the model being shaped by the three-dimensional shaping device 100 as the progress information D5. When any of the plurality of pieces of operation information D2 displayed on the display screen is selected by the input device 470, the display control unit 411 may display the progress information D5 indicating the progress of the model corresponding to the operation information D2. When any three-dimensional shaping device 100 is selected from the plurality of three-dimensional shaping devices 100 displayed in the list on the left side of the display screen, the display control unit 411 may display the shape of the model being shaped by the three-dimensional shaping device 100 as the model information D4 and display the user of the model as the user information D6.

It is not necessary for the display control unit 411 to display all pieces of the time information D1, the operation information D2, the remaining amount information D3, the model information D4, the progress information D5, and the user information D6 shown in FIG. 7. For example, at least one piece of the remaining amount information D3, the model information D4, the progress information D5, and the user information D6 may not be displayed.

Figure 8:
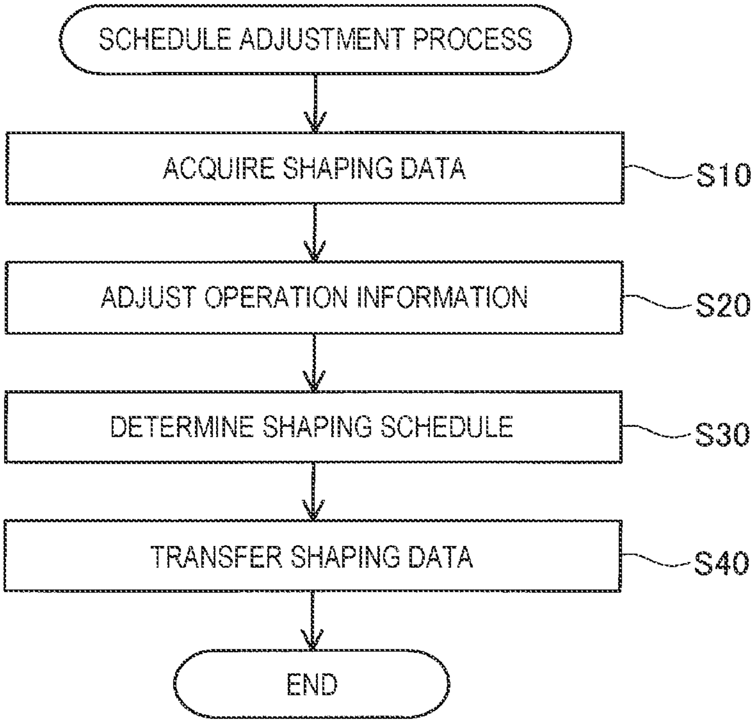
FIG. 8 is a flowchart of a schedule adjustment process.

FIG. 8 is a flowchart of a schedule adjustment process executed by the control device 400. This process is a process for the control device 400 to manage the shaping schedules of the models in the plurality of three-dimensional shaping devices 100.

In step S10, the schedule adjustment unit 412 of the control device 400 acquires the shaping data used for the shaping performed by each three-dimensional shaping device 100. The shaping data may be acquired from the storage unit 320 of the control device 400, or may be acquired from another device connected to the control device 400 via a network.

In step S20, the schedule adjustment unit 412 adjusts the operation information for each piece of shaping data.

Figure 9:
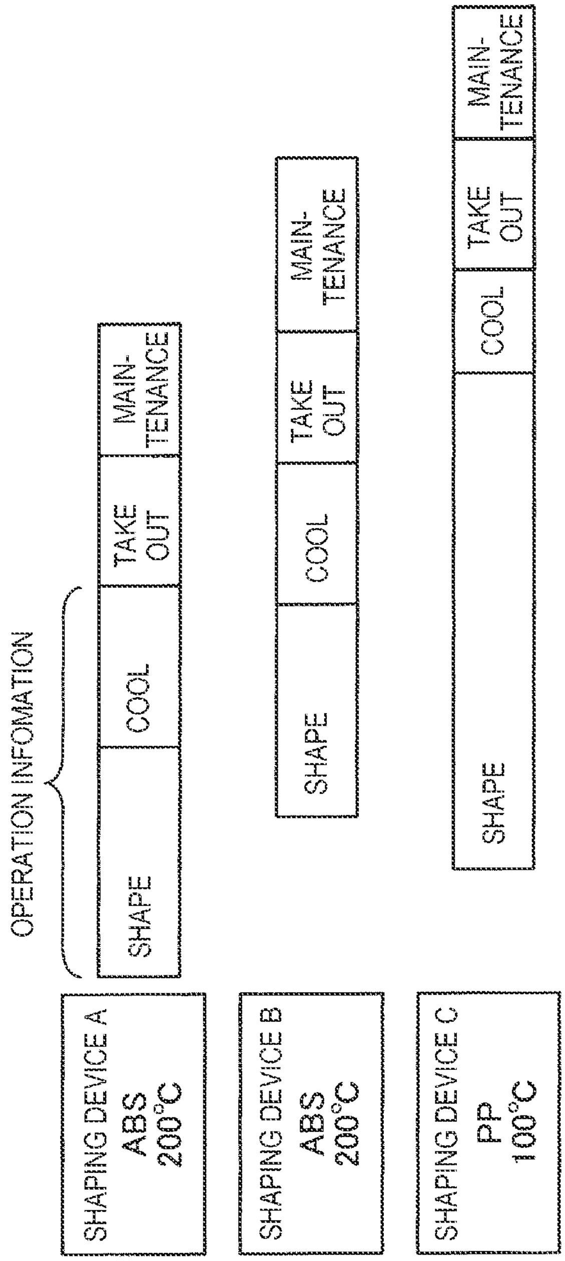
FIG. 9 shows an operation information adjustment method.

FIG. 9 shows an operation information adjustment method in step S20. In the embodiment, the schedule adjustment unit 412 adjusts the operation information, such that maintenance times after the shaping for the three-dimensional shaping devices 100 do not overlap. The operation information includes the shaping time for shaping the model and a cooling time for cooling the model after the shaping. The shaping time is determined according to the shape and the number of layers of the model, a nozzle diameter, and the like, and the cooling time is determined according to the shape and the number of layers of the model, a temperature characteristic of the shaping material, a plasticization temperature, and the like. In the embodiment, after the cooling is completed, a certain removable time is secured, and the operation information in the three-dimensional shaping device 100, that is, the shaping start time and the shaping end time are adjusted such that the times of the maintenance, to be performed after the certain removable time, of the three-dimensional shaping devices 100 do not overlap. As described above, since the shaping time and the cooling time are determined by the shape of the model or the like, the shaping start time is automatically adjusted by adjusting the shaping end time. During the maintenance, for example, operations such as cleaning of the three-dimensional shaping device 100 and exchange of materials are performed.

In step S30 in FIG. 8, the schedule adjustment unit 412 determines the shaping schedule of each three-dimensional shaping device 100 according to the adjusted operation information.

In step S40, the schedule adjustment unit 412 transfers the shaping data to each three-dimensional shaping device 100 according to the shaping schedule determined in step S30. In this manner, the models are formed by the three-dimensional shaping devices 100 according to the schedule shown in FIG. 9. In each three-dimensional shaping device 100, when the shaping of the model is completed, the user takes the model out of the three-dimensional shaping device 100.

According to the first embodiment described above, the time information D1, the operation information D2, the remaining amount information D3, and the like are displayed on the display unit 480 by the control device 400. Among these pieces of information, the operation information D2 is displayed corresponding to the time information D1, and the time information D1 is displayed in the specified scale or the specified time zone. Therefore, the plurality of three-dimensional shaping devices 100 can be efficiently managed.

In the embodiment, the control device 400 displays the model information D4 and the progress information D5 on the display unit 480 in addition to the time information D1, the operation information D2, and the remaining amount information D3. Therefore, the user can manage each three-dimensional shaping device 100 while checking these pieces of information.

In the embodiment, the shaping schedule is determined such that the maintenance times after the shaping in the three-dimensional shaping devices 100 do not overlap. Therefore, when a worker performs the maintenance on the plurality of three-dimensional shaping devices 100 alone, the scheduled maintenance times do not overlap. Therefore, it is possible to efficiently operate the plurality of three-dimensional shaping devices 100.

B. Second Embodiment

Figure 10:
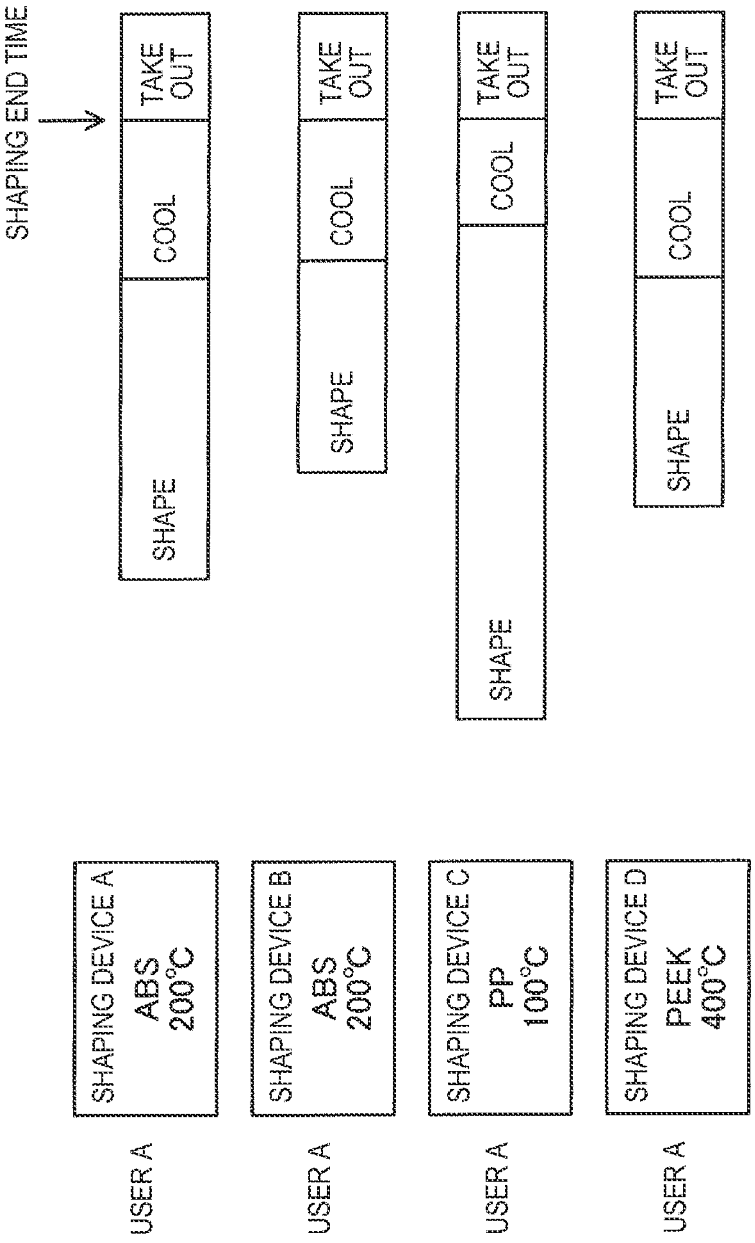
FIG. 10 shows an operation information adjustment method according to a second embodiment.

FIG. 10 shows an operation information adjustment method according to a second embodiment. In the first embodiment, as shown in FIG. 9, the schedule adjustment unit 412 adjusts the operation information, such that maintenance times after the shaping do not overlap. Alternatively, in the second embodiment, when the same user information is included in pieces of operation information different from each other, the schedule adjustment unit 412 adjusts the operation information such that an interval between the shaping end times of the three-dimensional shaping devices 100 is shorter than a predetermined interval. In other words, when the same user information is included in the operation information stored in one three-dimensional shaping device 100 and the operation information stored in the other three-dimensional shaping device 100, the schedule adjustment unit 412 adjusts the operation information such that the interval between the shaping end time of the one three-dimensional shaping device 100 and the shaping end time of the other three-dimensional shaping device 100 is shorter than the predetermined interval. The predetermined interval is, for example, 0 minutes to 30 minutes. In the embodiment, this interval is zero. That is, in the embodiment, the operation information is adjusted such that the shaping end times of the models of the same user coincide with each other. FIG. 10 shows a schedule in which the user A simultaneously forms a plurality of models using shaping devices A to D. The schedule adjustment unit 412 adjusts the shaping end times of the pieces of operation information such that cooling completion times of the three-dimensional shaping devices 100 become a same time. In this manner, the user can efficiently take out the models formed by the plurality of three-dimensional shaping devices 100. The configuration of the three-dimensional shaping system 10 in the second embodiment is the same as that in the first embodiment.

C. Third Embodiment

Figure 11:
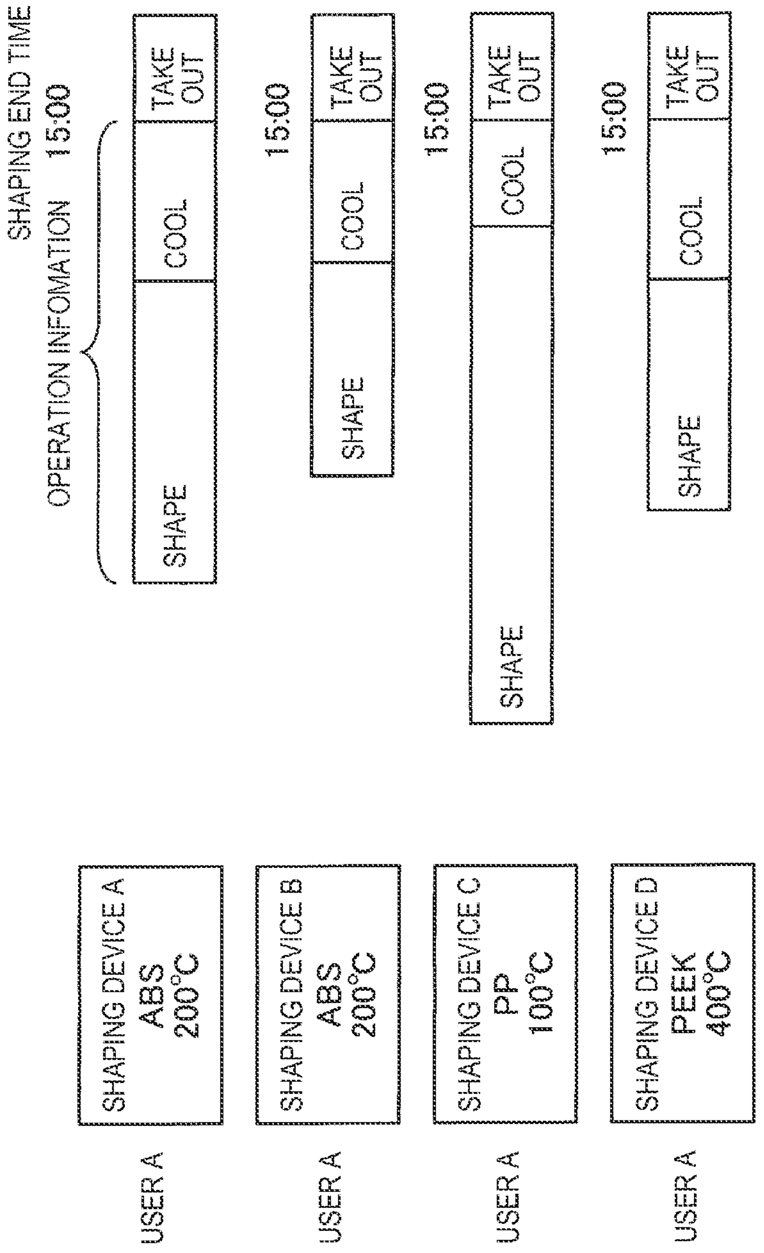
FIG. 11 shows an operation information adjustment method according to a third embodiment.

FIG. 11 shows an operation information adjustment method according to a third embodiment. In the first embodiment, as shown in FIG. 9, the schedule adjustment unit 412 adjusts the operation information, such that the maintenance times after the shaping do not overlap. Alternatively, in the third embodiment, the schedule adjustment unit 412 acquires time specifying information specifying the shaping end time from the user by the input device 470 or the like, and adjusts the operation information such that the shaping ends at a specified time. In the third embodiment, as shown in FIG. 11, when models of the same user are formed by the plurality of three-dimensional shaping devices 100, the operation information is adjusted such that the shaping end times coincide with the time specified by the user. In this manner, the user can efficiently take out the model at a desired time. The user may specify the shaping end times in the three-dimensional shaping devices 100 to be different from one another. The time specifying information may be included in, for example, the shaping data. The configuration of the three-dimensional shaping system 10 in the third embodiment is the same as that in the first embodiment.

D. Fourth Embodiment

Figure 12:
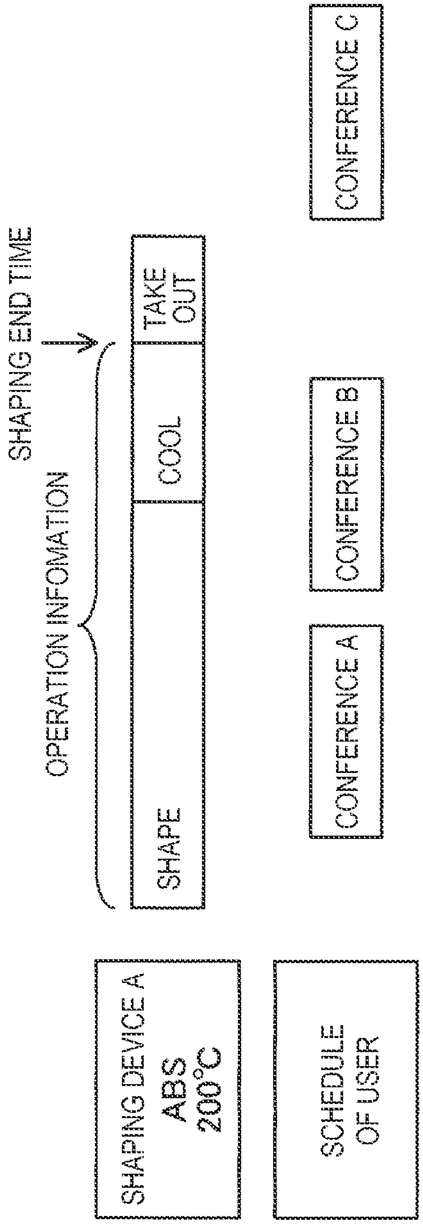
FIG. 12 shows an operation information adjustment method according to a fourth embodiment.

FIG. 12 shows an operation information adjustment method according to a fourth embodiment. In the first embodiment, as shown in FIG. 9, the schedule adjustment unit 412 adjusts the operation information, such that the maintenance times after the shaping do not overlap. Alternatively, in the fourth embodiment, the schedule adjustment unit 412 adjusts the operation information, such that the shaping ends in a period of time in which the schedule of the user is idle. Specifically, the schedule adjustment unit 412 acquires the schedule information of the user corresponding to the user information included in the operation information from, for example, a schedule service operated on the Internet or schedule software used by the user. Then, the schedule adjustment unit 412 identifies the period of time in which the schedule of the user is idle, and determines the shaping end time such that the shaping ends in the period of time. In this manner, the user can take out the model during a time of a gap, for example, an interval between conferences, and can efficiently proceed with the work. The configuration of the three-dimensional shaping system 10 in the fourth embodiment is the same as that in the first embodiment.

E. Fifth Embodiment

Figure 13:
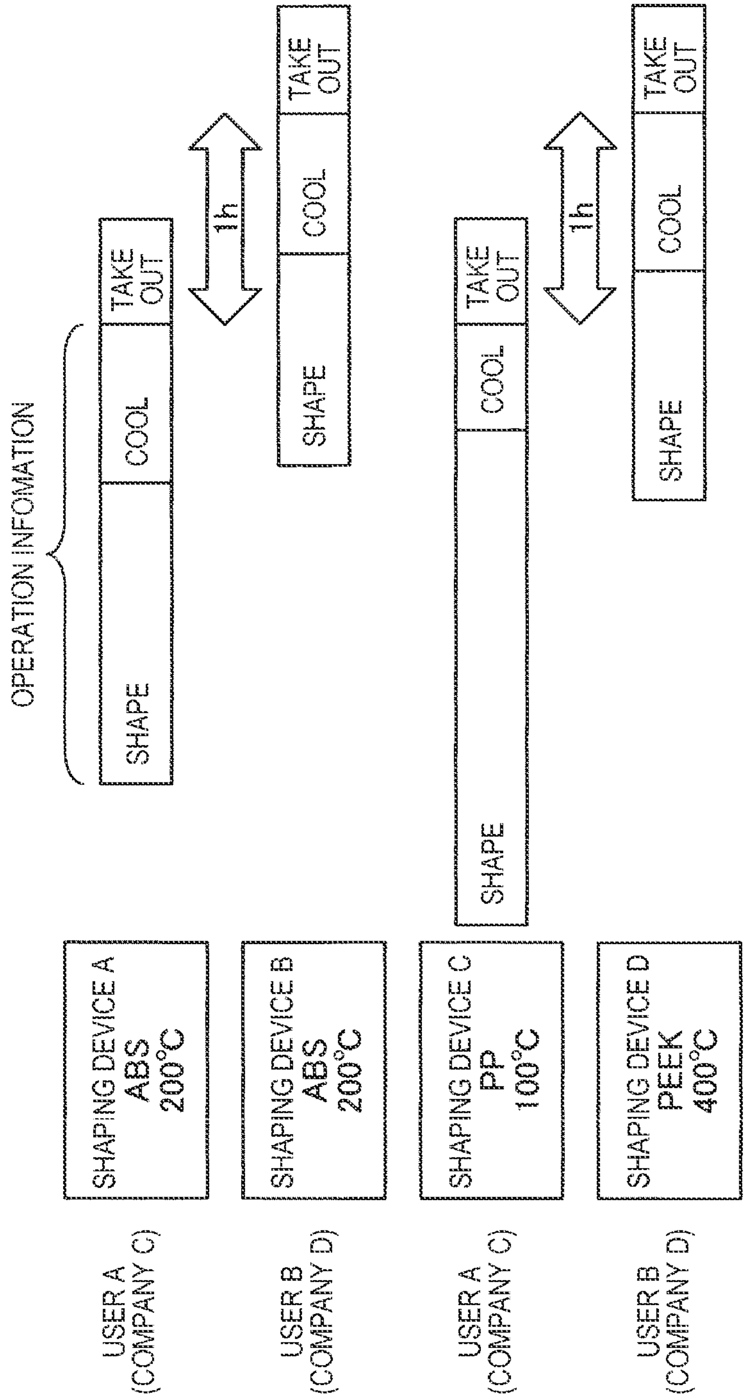
FIG. 13 shows an operation information adjustment method according to a fifth embodiment.

FIG. 13 shows an operation information adjustment method according to a fifth embodiment. In the first embodiment, as shown in FIG. 9, the schedule adjustment unit 412 adjusts the operation information, such that the maintenance times after the shaping do not overlap. Alternatively, in the fifth embodiment, when the user information included in pieces of operation information different from each other has a predetermined relationship, the schedule adjustment unit 412 adjusts the operation information such that an interval between the shaping end times of the three-dimensional shaping devices 100 is longer than a predetermined interval. In other words, when the user information included in the operation information in one three-dimensional shaping device 100 and the user information included in the operation information in the other three-dimensional shaping device 100 have the predetermined relationship, the schedule adjustment unit 412 adjusts the operation information such that the interval between the shaping end time of the one three-dimensional shaping device 100 and the shaping end time of the other three-dimensional shaping device 100 is longer than the predetermined interval. Specifically, in the embodiment, when the users corresponding to the user information included in the pieces of operation information different from each other belong to different organizations or companies, the schedule adjustment unit 412 adjusts the operation information such that the interval between the shaping end times is one hour or more. In this manner, it is possible to prevent take-out times of the models of the users belonging to different organizations or companies from overlapping each other, and thus it is possible to prevent the model from being visually recognized by a third party when taking out a highly confidential model. The "predetermined relationship" is not limited to the relationship in which the user belongs to a different organization or company, and may be, for example, a relationship in which the users are different. The configuration of the three-dimensional shaping system 10 in the fifth embodiment is the same as that in the first embodiment.

F. Sixth Embodiment

Figure 14:
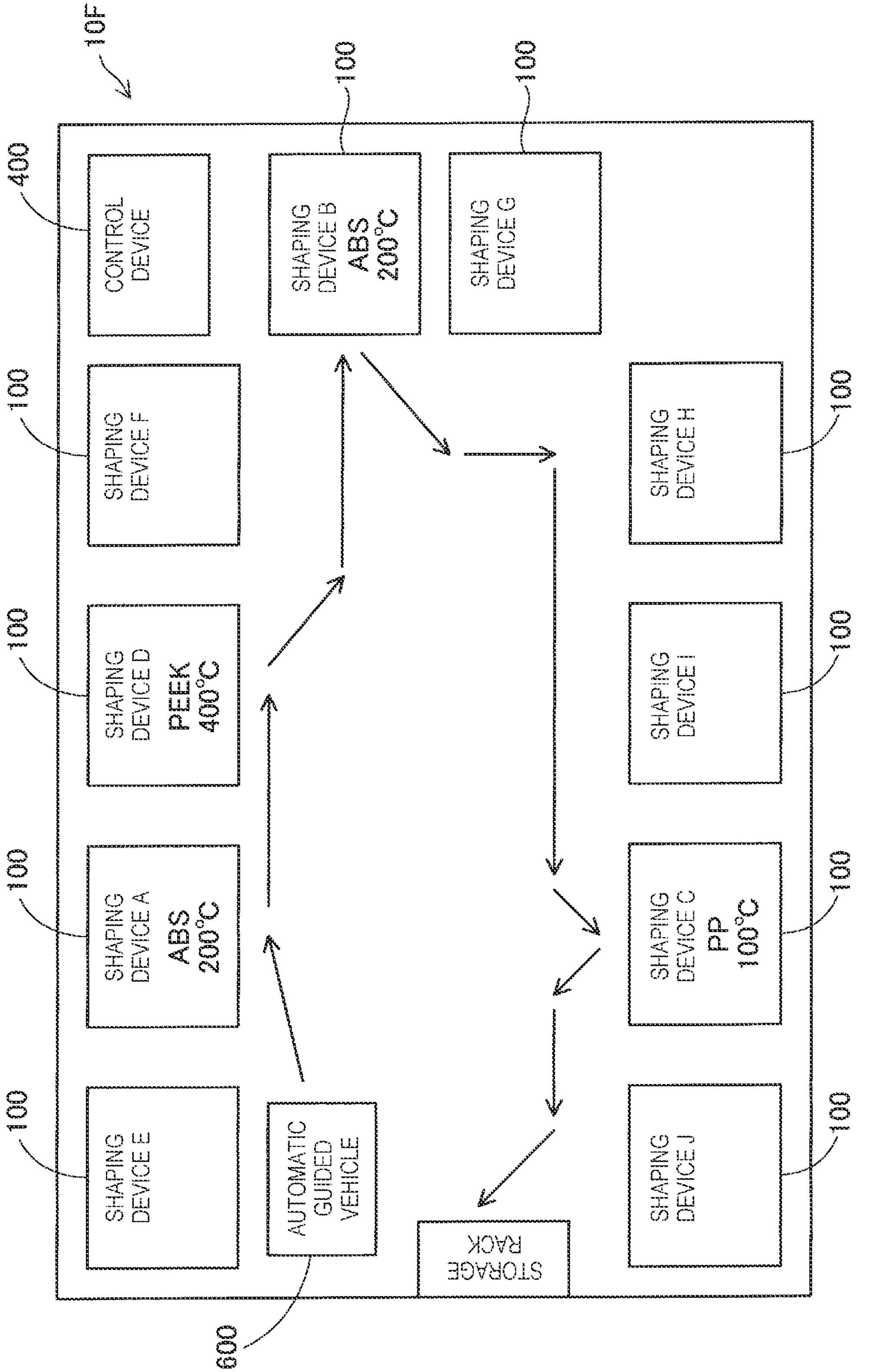
FIG. 14 shows a schematic configuration of a three-dimensional shaping system according to a sixth embodiment.

FIG. 14 is a diagram showing a schematic configuration of a three-dimensional shaping system 10F according to a sixth embodiment. In the first embodiment, the models formed by the three-dimensional shaping devices 100 are taken out by the user. On the other hand, in the sixth embodiment, the models formed by the three-dimensional shaping devices 100 are taken out and conveyed by an automatic guided vehicle 600. The automatic guided vehicle 600 includes a battery and wheels driven by the battery, and autonomously moves on a floor on which the plurality of three-dimensional shaping devices 100 are provided. The automatic guided vehicle 600 is provided with a plurality of accommodation portions, and each of the accommodation portions can accommodate a model formed by a respective one of the three-dimensional shaping devices 100.

Figure 15:
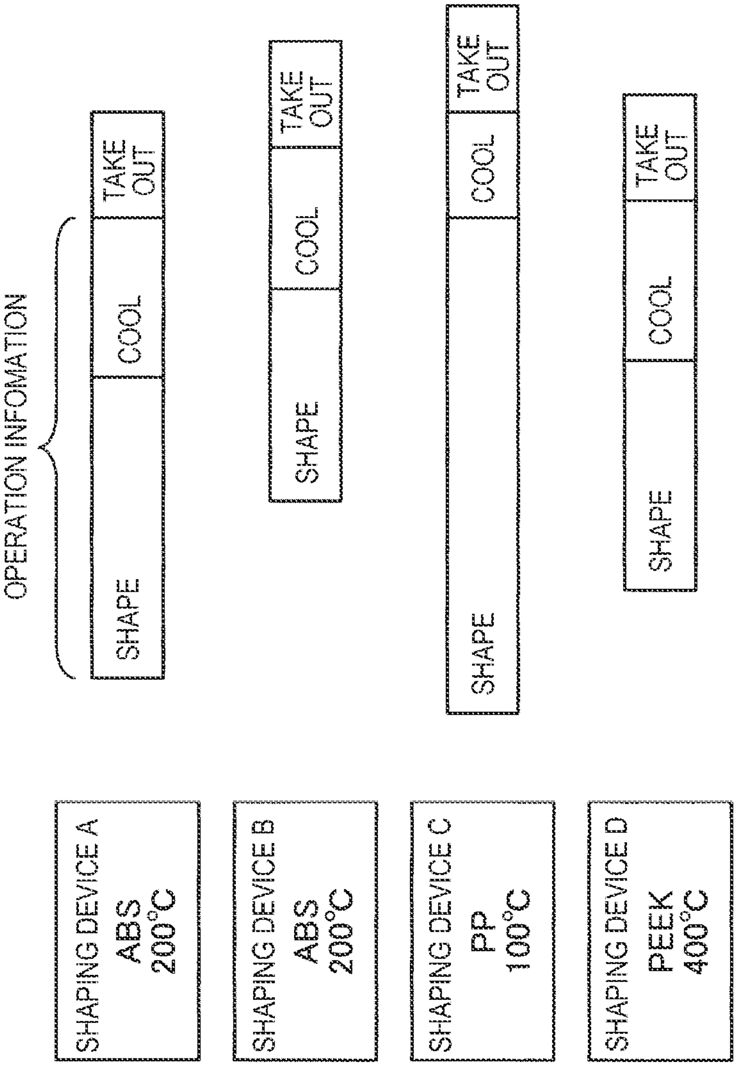
FIG. 15 shows an operation information adjustment method according to the sixth embodiment.

FIG. 15 shows an operation information adjustment method according to the sixth embodiment. In the embodiment, the schedule adjustment unit 412 acquires providing location information indicating a providing location of the three-dimensional shaping device 100, and adjusts the operation information based on the providing location information. The providing location information is stored in, for example, the storage device 430 of the control device 400. In the example shown in FIG. 14, the automatic guided vehicle 600 collects and conveys the shaped objects in a shortest path in an order of the shaping device A, the shaping device D, the shaping device B, and the shaping device C. Therefore, as shown in FIG. 15, the schedule adjustment unit 412 adjusts the operation information corresponding to the three-dimensional shaping devices 100 such that the shaping is completed in the order of the shaping device A, the shaping device D, the shaping device B, and the shaping device C. In this manner, the models formed by the plurality of three-dimensional shaping devices 100 can be more efficiently collected by the automatic guided vehicle 600.

G. Seventh Embodiment

Figure 16:
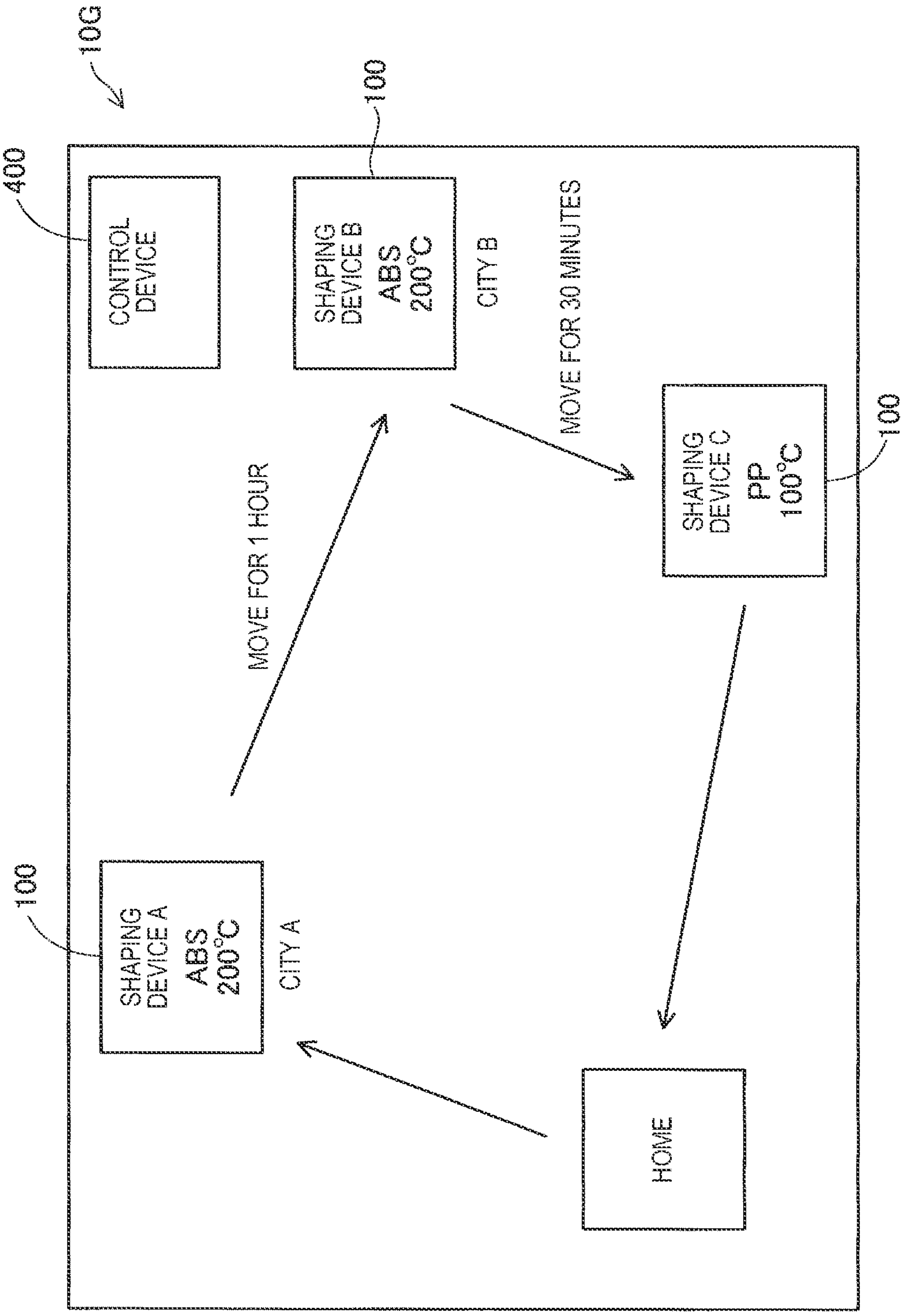
FIG. 16 shows a schematic configuration of a three-dimensional shaping system according to a seventh embodiment.

FIG. 16 is a diagram showing a schematic configuration of a three-dimensional shaping system 10G according to a seventh embodiment. In the first embodiment, the plurality of three-dimensional shaping devices 100 are provided in a same place. On the other hand, in the seventh embodiment, the plurality of the three-dimensional shaping devices 100 are disposed in different regions, and the user collects the models formed by the three-dimensional shaping devices 100 from home or the company using an automatic car or public transportation.

Figure 17:
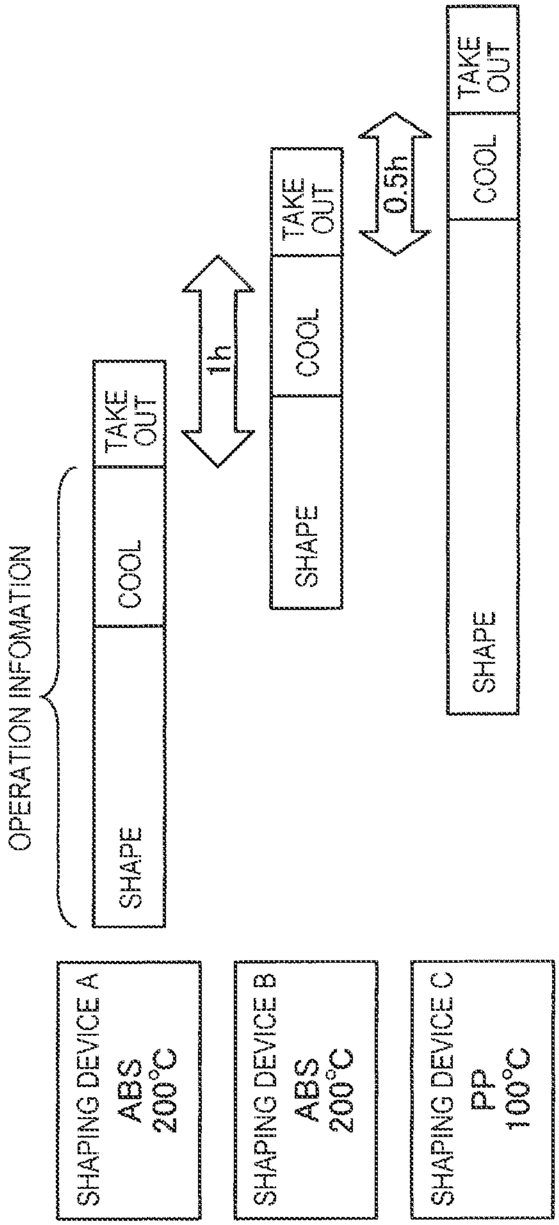
FIG. 17 shows an operation information adjustment method according to the seventh embodiment.

FIG. 17 shows an operation information adjustment method according to the seventh embodiment. In the embodiment, as in the sixth embodiment, the schedule adjustment unit 412 also acquires the providing location information indicating the providing location of the three-dimensional shaping device 100, and adjusts the operation information based on the providing location information. At this time, the schedule adjustment unit 412 adjusts the interval between the shaping end times of the models according to a movement path and a movement time between the three-dimensional shaping devices 100. In this manner, the user can efficiently collect the models formed by the three-dimensional shaping devices 100 disposed in different regions. The movement path and a movement distance between the three-dimensional shaping devices 100 can be acquired from, for example, a navigation site operated on the Internet.

H. Other Embodiments (H1) In the above-described embodiments, at least two of the plurality of three-dimensional shaping devices 100 may have different shaping methods. In this case, the schedule adjustment unit 412 may receive, for each piece of shaping data, shaping method specifying information specifying a specific shaping method from the user through the input device 470. Examples of the shaping method include the material extrusion method, an ink jet method, a direct metal deposition (DMD) method, and a binder jet method.

When receiving the shaping method specifying information from the user, the schedule adjustment unit 412 transmits the shaping data to the three-dimensional shaping device 100 corresponding to the method. On the other hand, when the shaping method specifying information is not received, the schedule adjustment unit 412 transmits the shaping data in which the shaping method is not specified to the three-dimensional shaping device 100 that is not operating, and distributes the shaping of the model. In this manner, operating rates of the plurality of three-dimensional shaping devices 100 can be increased. The shaping method specifying information may be included in the shaping data, for example, instead of being received by the input device 470.

(H2) In the third embodiment, a business operator who operates a three-dimensional shaping service by the three-dimensional shaping device 100 may charge the user with a higher fee than a normal fee when the shaping end time is specified by the user. In addition, a fee structure may be adopted in which an extra fee is set when the shaping end time is specified in daytime, and a discount fee is set when the shaping end time is specified in midnight.

(H3) In each of the above embodiments, the display control unit 411 may display the display screen shown in FIG. 7 not only on the display unit 480 coupled to the control device 400 but also on another device coupled to the control device 400 via a network.

(H4) In the above embodiments, the shaping unit 110 plasticizes the material by the flat screw 40. Alternatively, the shaping unit 110 may plasticize the material by, for example, rotating an inline screw. The shaping unit 110 may plasticize a filament-shaped material with a heater.

I. Other Aspects

The present disclosure is not limited to the embodiments described above, and may be implemented by various configurations without departing from the gist of the present disclosure. For example, in order to solve a part or all of problems described above, or to achieve a part or all of effects described above, technical characteristics in the embodiments corresponding to technical characteristics in aspects to be described below can be replaced or combined as appropriate. Technical features can be deleted as appropriate unless described as essential in the present specification.

(1) According to a first aspect of the present disclosure, a control device communicating with a plurality of three-dimensional shaping devices is provided. The control device includes a display control unit configured to display, on a display unit, time information indicating a time, operation information including information indicating a shaping time of a model in each of the three-dimensional shaping devices, and remaining amount information indicating a remaining amount of a material used in the three-dimensional shaping device selected from the plurality of three-dimensional shaping devices. The display control unit displays the operation information corresponding to the time information, and the display control unit displays the time information in a specified scale or a specified time zone. According to such an aspect, a plurality of three-dimensional shaping devices can be efficiently managed.

(2) In the above aspect, the display control unit may display, on the display unit, model information indicating a shape of the model corresponding to the operation information. According to such an aspect, the three-dimensional shaping devices can be managed while checking the shape of the model.

(3) In the above aspect, the display control unit may display, on the display unit, progress information indicating a progress degree of the model being shaped by the three-dimensional shaping device selected from the plurality of three-dimensional shaping devices. According to such an aspect, the three-dimensional shaping devices can be managed while checking the progress degree.

(4) In the above aspect, the control device may further include a schedule adjustment unit configured to adjust a shaping end time of the three-dimensional shaping device by adjusting the operation information. According to such an aspect, it is possible to efficiently manage times of the shaped objects taken out of the plurality of three-dimensional shaping devices.

(5) In the above aspect, the operation information may include user information, and when same user information is included in the operation information in one of the three-dimensional shaping devices and the operation information in another of the three-dimensional shaping devices, the schedule adjustment unit may adjust the operation information such that an interval between the shaping end time of the one of the three-dimensional shaping devices and the shaping end time of the other of the three-dimensional shaping devices is shorter than a predetermined interval. According to such an aspect, the same user can efficiently take the shaped objects out of the plurality of three-dimensional shaping devices.

(6) In the above aspect, the schedule adjustment unit may acquire time specifying information specifying the shaping end time, and adjust the operation information such that shaping ends at a specified time. According to such an aspect, it is possible to easily manage the take-out times of the shaped objects.

(7) In the above aspect, the operation information may include user information, and the schedule adjustment unit may acquire schedule information indicating a schedule of a user corresponding to the user information, and adjust the operation information such that shaping ends in a period of time in which the schedule of the user is idle. According to such an aspect, it is possible to improve work efficiency of the user.

(8) In the above aspect, the operation information may include user information, and when the user information included in the operation information in one of the three-dimensional shaping devices and the user information included in the operation information in another of the three-dimensional shaping devices have a predetermined relationship, the schedule adjustment unit may adjust the operation information such that an interval between the shaping end time of the one of the three-dimensional shaping devices and the shaping end time of the other of the three-dimensional shaping devices is longer than a predetermined interval. According to such an aspect, it is possible to improve confidentiality of the shaped object.

(9) In the above aspect, the schedule adjustment unit may acquire providing location information indicating providing locations of the three-dimensional shaping devices, and adjust the operation information based on the providing location information. According to such an aspect, the shaped object shaped by the plurality of three-dimensional shaping devices can be efficiently collected.

(10) In the above aspect, at least two of the three-dimensional shaping devices may have different shaping methods, the schedule adjustment unit may receive shaping method specifying information specifying a specific shaping method, and when the shaping method specifying information is not received, the schedule adjustment unit may distribute the shaping of the model to the three-dimensional shaping device that is not operating. According to such an aspect, the operating rates of the plurality of three-dimensional shaping devices can be increased.

The present disclosure is not limited to the control device described above, and can be implemented by various aspects such as a three-dimensional shaping system, a computer program, and a non-transitory tangible recording medium in which a computer program is recorded in a computer-readable manner.

What is claimed is:

1. A control device communicating with a plurality of three-dimensional shaping devices, the control device comprising:
- a memory configured to store a program; and
- a processor configured to execute the program so as to:
  - cause a display to display time information indicating a time, operation information including information indicating a shaping time of a model in each of the three-dimensional shaping devices, and remaining amount information indicating a remaining amount of a material used in a corresponding three-dimensional shaping device of the plurality of three-dimensional shaping devices;
  - schedule maintenance times of the plurality of three-dimensional shaping devices by adjusting the shaping time in the operation information;
  - control cooling off time of each of the plurality of three-dimensional shaping devices based on the operation information; and
  - operate the plurality of three-dimensional shaping devices in a non-overlapping maintenance time state by adjusting the shaping time and the cooling off time, the maintenance times of the plurality of three-dimensional shaping devices being not overlapped one another in the non-overlapping maintenance time state, wherein the processor causes the display to:

display the operation information corresponding to the time information; and display the time information in a specified scale or a specified time zone, the processor is further configured to adjust a shaping end time of the corresponding three-dimensional shaping device by adjusting the operation information, and when same user information is included in the operation information in one of the three-dimensional shaping devices and the operation information in another of the three-dimensional shaping devices, the processor adjusts the operation information such that an interval between the shaping end time of the one of the three-dimensional shaping devices and the shaping end time of the another of the three-dimensional shaping devices is shorter than a predetermined interval.

2. The control device according to claim 1, wherein the processor is further configured to cause the display to display model information indicating a shape of the model corresponding to the operation information.

3. The control device according to claim 1, wherein the processor is further configured to cause the display to display progress information indicating a progress degree of the model being shaped by the corresponding three-dimensional shaping device.

4. The control device according to claim 1, wherein the processor is further configured to acquire time specifying information specifying the shaping end time, and adjust the operation information such that shaping ends at the specified shaping end time.

5. The control device according to claim 1, wherein the operation information includes user information, and the processor is further configured to acquire schedule information indicating a schedule of a user corresponding to the user information and adjust the operation information such that shaping ends in a period of time in which the schedule of the user is idle.

6. The control device according to claim 1, wherein the operation information includes user information, and when the user information included in the operation information in one of the three-dimensional shaping devices and the user information included in the operation information in another of the three-dimensional shaping devices have a predetermined relationship, the processor adjusts the operation information such that an interval between the shaping end time of the one of the three-dimensional shaping devices and the shaping end time of the another of the three-dimensional shaping devices is longer than a predetermined interval.

7. The control device according to claim 1, wherein the processor is further configured to acquire providing location information indicating providing locations of the three-dimensional shaping devices and adjust the operation information based on the providing location information.

8. The control device according to claim 1, wherein at least two of the three-dimensional shaping devices have different shaping methods, the processor is further configured to receive shaping method specifying information specifying a specific shaping method, and when the shaping method specifying information is not received, the processor is further configured to distribute the shaping of the model to one of the three-dimensional shaping devices that is not operating.

* * * * *